(12) United States Patent
Salter et al.

(10) Patent No.: US 10,549,607 B2
(45) Date of Patent: Feb. 4, 2020

(54) LIGHTING ASSEMBLY DISPOSED ON AN INTERIOR SIDE OF A WINDOW OF A VEHICLE AND METHOD OF ILLUMINATING AN AREA OUTSIDE THE VEHICLE

(71) Applicant: Ford Global Technologies, LLC, Dearborn, MI (US)

(72) Inventors: Stuart C. Salter, White Lake, MI (US); Paul Kenneth Dellock, Northville, MI (US); James J. Surman, Clinton Township, MI (US); David Brian Glickman, Southfield, MI (US); Balbir S. Grewal, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 152 days.

(21) Appl. No.: 15/600,170

(22) Filed: May 19, 2017

(65) Prior Publication Data

US 2018/0334087 A1    Nov. 22, 2018

(51) Int. Cl.
| | |
|---|---|
| *B60Q 1/24* | (2006.01) |
| *B60Q 1/26* | (2006.01) |
| *B60J 1/02* | (2006.01) |
| *B60Q 1/18* | (2006.01) |
| *B60Q 1/00* | (2006.01) |
| *B60Q 1/12* | (2006.01) |

(52) U.S. Cl.
CPC .............. *B60J 1/02* (2013.01); *B60Q 1/0035* (2013.01); *B60Q 1/18* (2013.01); *B60Q 1/268* (2013.01); *B60Q 1/12* (2013.01)

(58) Field of Classification Search
CPC .......... B60Q 1/24; B60Q 1/02; B60Q 1/2696; B60Q 1/268
See application file for complete search history.

(56) References Cited

U.S. PATENT DOCUMENTS

| | | | |
|---|---|---|---|
| 7,036,965 B2 * | 5/2006 | Dalton, Jr. ............. | B60Q 1/268 362/240 |
| 7,106,185 B1 * | 9/2006 | Neufeglise .......... | B60Q 1/2611 340/468 |

(Continued)

FOREIGN PATENT DOCUMENTS

| | | |
|---|---|---|
| DE | 102010023988 | 2/2011 |
| DE | 102014014126 | 3/2016 |

(Continued)

*Primary Examiner* — Joseph L Williams
(74) *Attorney, Agent, or Firm* — Vichit Chea; Carlson, Gaskey & Olds, P.C.

(57) ABSTRACT

An exemplary lighting assembly includes a first light emitting device on an interior side of a window of a vehicle, and a second light emitting device on the interior side, the first and the second light emitting devices configured to selectively illuminate respective areas through a perimeter region of the window in response to a change in an orientation of the vehicle. Another exemplary lighting assembly includes, among other things, a window of a vehicle, the window having a perimeter region, a coating covering at least a portion of the perimeter region, and a light emitting device on an interior side of the window. The coating provides an aperture to permit light from the light emitting device to move through the perimeter region.

20 Claims, 4 Drawing Sheets

(56) References Cited

U.S. PATENT DOCUMENTS

| | | | |
|---|---|---|---|
| 7,261,447 B2 | 8/2007 | Menke et al. | |
| 7,804,420 B2* | 9/2010 | Girouard | B60Q 1/268 |
| | | | 116/28 R |
| 2004/0208013 A1* | 10/2004 | Dalton, Jr. | B60Q 1/268 |
| | | | 362/488 |
| 2006/0187670 A1* | 8/2006 | Dalton, Jr. | B60Q 1/268 |
| | | | 362/503 |
| 2015/0375673 A1 | 12/2015 | Testai et al. | |
| 2018/0202622 A1* | 7/2018 | Arce | F21S 43/15 |

FOREIGN PATENT DOCUMENTS

| | | |
|---|---|---|
| WO | 2010140722 | 12/2010 |
| WO | 2013118827 | 8/2013 |

* cited by examiner

LIGHTING ASSEMBLY DISPOSED ON AN INTERIOR SIDE OF A WINDOW OF A VEHICLE AND METHOD OF ILLUMINATING AN AREA OUTSIDE THE VEHICLE

TECHNICAL FIELD

This disclosure relates generally to vehicle lighting. More particularly, this disclosure relates to an auxiliary lighting positioned on an interior side of a vehicle window within a peripheral region of the vehicle window.

BACKGROUND

Many vehicles incorporate auxiliary lighting assemblies that are used to supplement lighting provided by, for example, vehicle headlights. One such auxiliary lighting assembly is often referred to as a light bar.

The typical light bar mounts to an exterior of the vehicle above a windshield. The light bar is used to illuminate areas in front of the vehicle, which can help the operator of the vehicle navigate.

Off-road vehicles often include such light bars. When off-roading along a path, an operator turns on the light bar to illuminate the path, which helps an operator navigate and avoid obstacles. Light bars mounted to the exterior can be difficult to clean, and difficult to maneuver beneath obstacles.

SUMMARY

A lighting assembly according to an exemplary aspect of the present disclosure includes, among other things, a first light emitting device on an interior side of a window of a vehicle, and a second light emitting device on the interior side. The first and the second light emitting devices are configured to selectively illuminate respective areas through a perimeter region of the window in response to a detected change in an orientation of the vehicle.

In a further non-limiting embodiment of the foregoing assembly, the respective areas are on an exterior side of the window.

A further non-limiting embodiment of any of the foregoing assemblies includes a coating in the perimeter region of the window. The first and second light emitting devices illuminate the respective areas through apertures in the coating.

In a further non-limiting embodiment of any of the foregoing assemblies, the coating is opaque.

In a further non-limiting embodiment of any of the foregoing assemblies, the coating defines a daylight opening through the window. The aperture in the coating is outside an outer perimeter of the daylight opening.

In a further non-limiting embodiment of any of the foregoing assemblies, the first light emitting device is positioned further from a lateral side of the vehicle than the second light emitting device. The second light emitting device is configured to illuminate the respective areas in response to the vehicle turning toward the lateral side.

In a further non-limiting embodiment of any of the foregoing assemblies, the first and second light emitting devices are configured to illuminate the respective areas in response to the vehicle ascending or descending a grade.

In a further non-limiting embodiment of any of the foregoing assemblies, the assembly includes a third light emitting device. The first light emitting device is disposed horizontally between the second light emitting device on a passenger side of the vehicle, and the third light emitting device on a driver side of the vehicle. The first light emitting device is configured to illuminate the area when the vehicle turns toward the passenger side or the driver side. The second light emitting device is configured to illuminate the area when the vehicle turns toward the passenger side, but not when the vehicle turns toward the driver side. The third light emitting device is configured to illuminate the area when the vehicle turns toward the driver side, but not when the vehicle turns toward the passenger side.

In a further non-limiting embodiment of any of the foregoing assemblies, the first and second light emitting devices each comprise at least one light emitting diode.

A lighting assembly according to an exemplary aspect of the present disclosure includes, among other things, a window of a vehicle. The window has a perimeter region. A coating covers at least a portion of the perimeter region. A light emitting device is on an interior side of the window. The coating provides at least one aperture to permit light from the light emitting device to move through the perimeter region.

In a further non-limiting embodiment of the foregoing assembly, the coating defines a daylight opening through the window. The aperture in the coating is outside an outer perimeter of the daylight opening.

In a further non-limiting embodiment of the foregoing assembly, the coating is opaque.

A method of illuminating an area outside a vehicle according to an exemplary aspect of the present disclosure includes, among other things, passing light from a light emitting device on an interior side of a window through an aperture in a coating that covers a portion of the window. The lighting illuminates an area on an exterior side of the window.

In a further non-limiting embodiment of the foregoing method, the light emitting device is a first light emitting device. The method further comprises selectively passing light from a second light emitting device on the interior side through the window in response to a change in an orientation of the vehicle.

In a further non-limiting embodiment of any of the foregoing methods, the second light emitting device is closer to lateral side of the vehicle than the first light emitting device. The second light emitting device is activated to pass light through the window in response to the vehicle turning toward the lateral side.

In a further non-limiting embodiment of any of the foregoing methods, the second light emitting device is activated to pass light through the window in response to the vehicle ascending or descending a grade.

In a further non-limiting embodiment of any of the foregoing methods, the first light emitting device includes at least one light emitting diode.

In a further non-limiting embodiment of any of the foregoing methods, the aperture is an aperture in a frit.

In a further non-limiting embodiment of any of the foregoing methods, the coating defines a daylight opening through the window. The aperture in the coating is outside an outer perimeter of the daylight opening.

In a further non-limiting embodiment of any of the foregoing methods, the coating is opaque.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to a lighting assembly that is covered by a window of the vehicle. Light passes through a perimeter region of the window to illuminate areas outside the vehicle. The lighting assembly is substantially hidden when viewed from outside the vehicle. In some examples, the lighting assembly can be used in place of a light bar mounted to an exterior of the vehicle.

Figure 1:
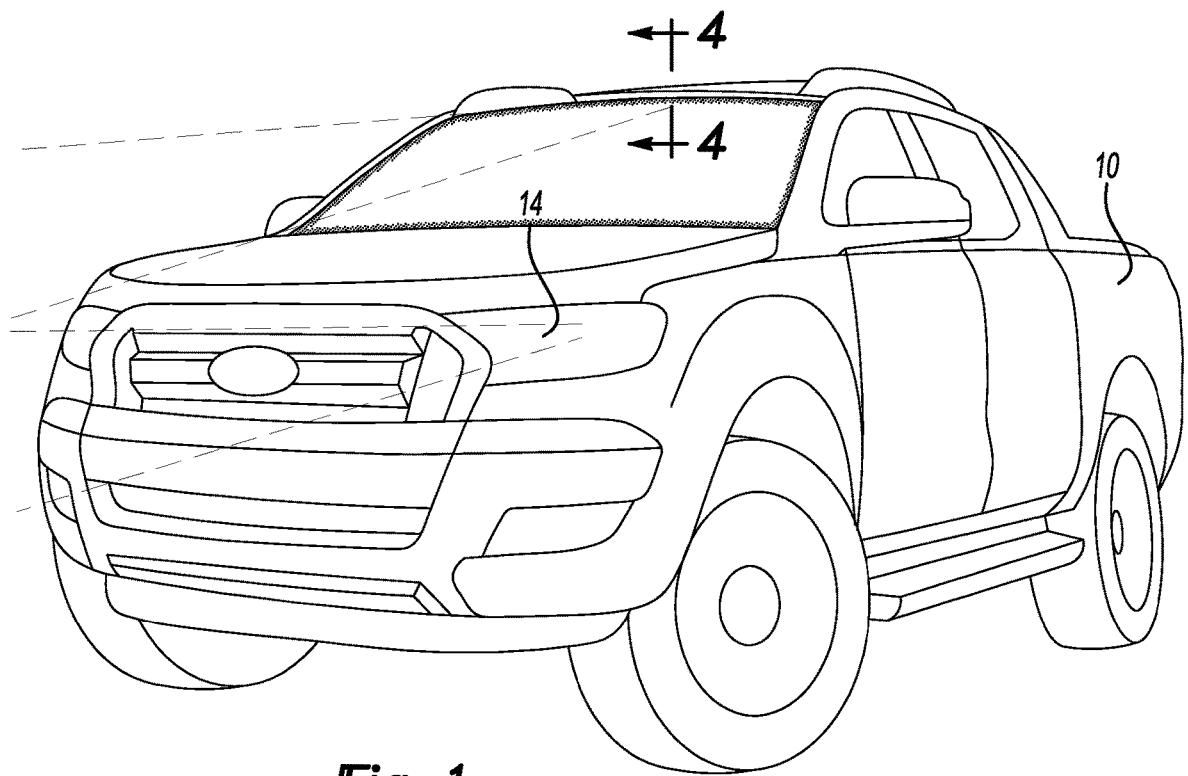
FIG. 1 illustrates a perspective view of a vehicle incorporating a lighting assembly according to an exemplary embodiment of the present disclosure.
Figure 2:
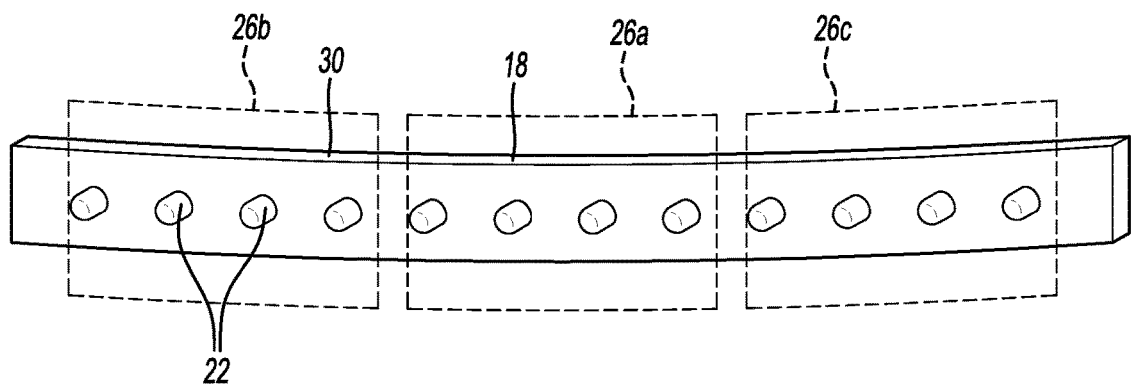
FIG. 2 illustrates the lighting assembly from the FIG. 1 vehicle.
Figure 3:
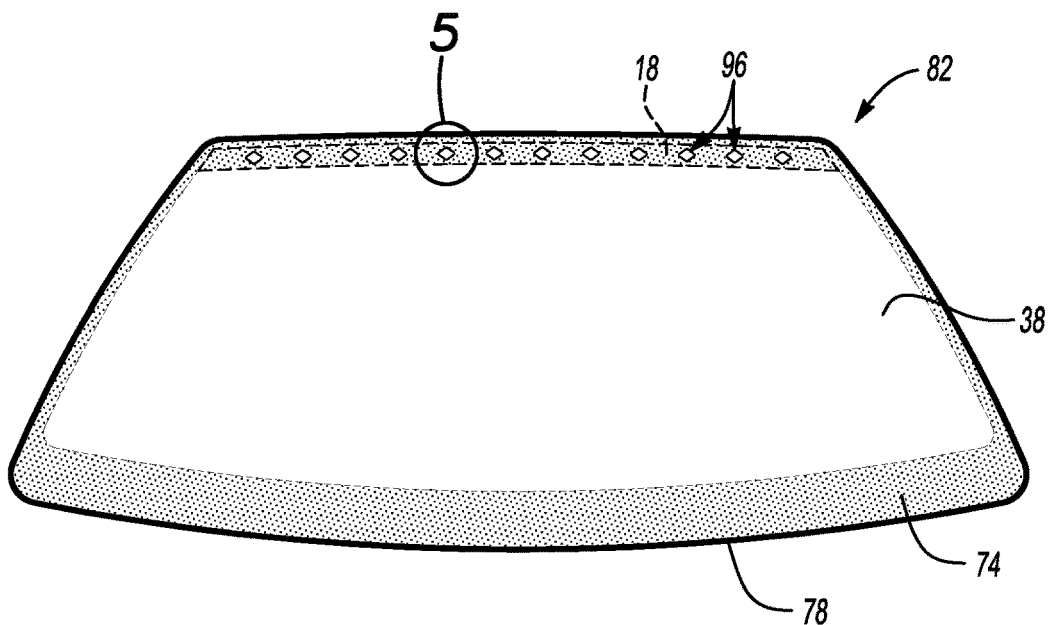
FIG. 3 illustrates a front view of the lighting assembly and a window of the vehicle of FIG. 1.

Referring now to FIGS. 1 to 3, an exemplary vehicle 10 includes headlights 14 and a lighting assembly 18. The lighting assembly 18 can supplement light from the headlights 14 to provide an auxiliary source of light. The headlights 14 and the lighting assembly 18 are used to illuminate areas outside an interior of the vehicle 10. In this example, the areas are substantially in front of the vehicle 10.

The lighting assembly 18 includes a plurality of light emitting devices 22. The light emitting devices 22, when activated, illuminate to provide light from the lighting assembly 18.

In an exemplary non-limiting embodiment, the headlights 14 are used during on-road operation of the vehicle 10 and the lighting assembly 18 remains off. If the vehicle 10 switches to off-road operation, an operator of the vehicle 10 actuates a switch to activate the lighting assembly 18. Alternatively, the lighting assembly 18 could activate automatically. When activated, lighting assembly 18 supplements lighting from the headlights 14 during the off-road operation. Of course, the lighting assembly 18 could be used to illuminate during on-road operation if desired. Further, the light emitting devices 22 can be used when the headlights 14 are turned off or otherwise not illuminating. Also, the lighting assembly 18 can be used when the vehicle 10 is stationary, or when the vehicle 10 is moving.

The light emitting devices 22 of the lighting assembly 18 are, in this example, segregated into a first group 26a, a second group 26b, and a third group 26c. The group 26a includes four individual light emitting devices 22, as does the second group 26b and the third group 26c. In other examples, the groups 26a, 26b, and 26c, can include less than four light emitting devices 22, such as one light emitting device 22. In other examples, the groups 26a, 26b, and 26c, can include more than four light emitting devices 22, such as eight light emitting device 22. The number of light emitting devices 22 within each group 26a, 26b, and 26c can vary. For example, the groups 26b and 26c could each include two light emitting devices 22 while the group 26a includes ten light emitting devices.

In this example, the first group 26a extends across a longitudinal centerline of the vehicle 10, the second group 26b is on a passenger side of the first group 26a, and the third group 26c is on a driver side. The second group 26b and the third group 26c are thus closer to lateral sides of the vehicle 10 than the first group 26a.

The light emitting devices 22 are light emitting diodes (LEDs) in this example, that are secured to a common base 30. In some examples, the light emitting diodes are considered high-powered LEDs. A high-powered LED can, in some examples, emit 1200 lumens at 1 amp. The high-powered LED can include four individual LEDs arranged in series within a single package. The high-powered LEDs can be similar to LEDs used in the headlights 14 to reduce thermal energy emissions and to match the beams of light from the headlights 14. A low-powered LED, in contrast to high-powered LEDs, may emit 40 lumens at 0.1 amps. Low-powered LEDs can be used in interior map lamps, for example.

The lighting assembly 18 extends along a vertical top of a window 38 of the vehicle 10. The window 38 is a windshield in this example. In other examples, the window 38 is a rear facing window, or a side facing window.

In this exemplary embodiment, the example light emitting devices 22 are substantially vertically aligned. In other embodiments, light emitting devices 22 of the lighting assembly 18, or another lighting assembly, are positioned along the laterally outer sides of the window 38.

Figure 4:
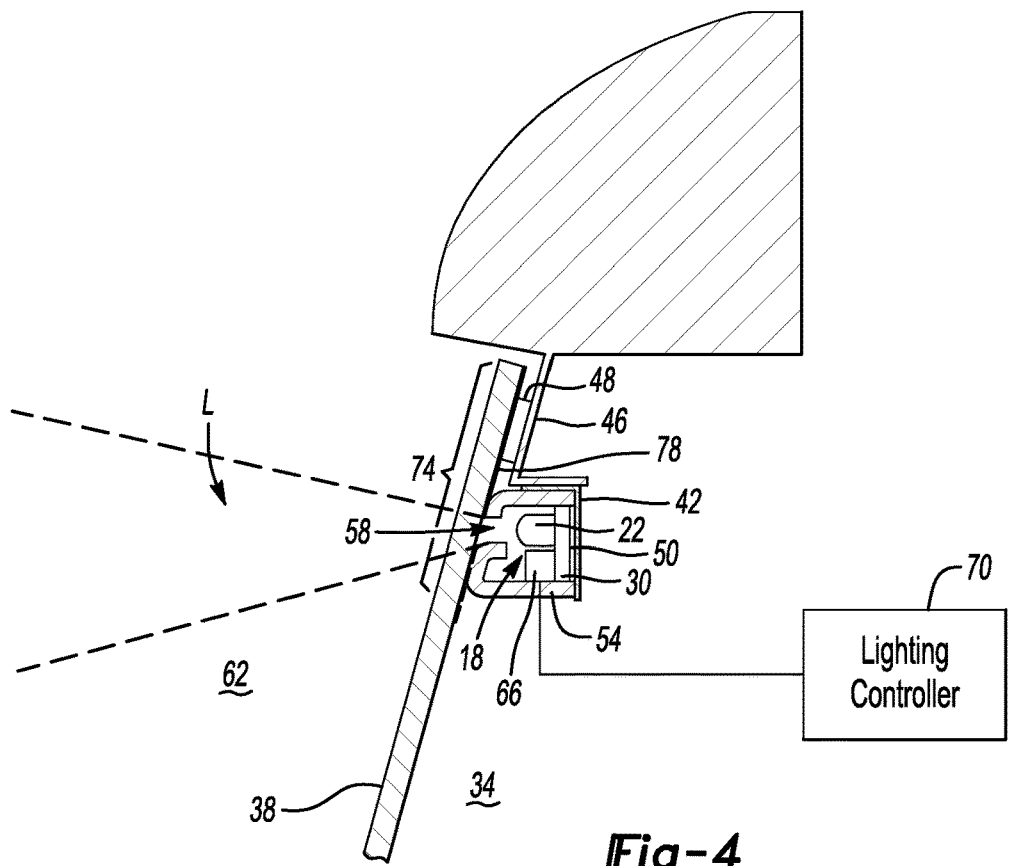
FIG. 4 illustrates a section view taken along the plane of Line 4-4 in FIG. 1.

Referring now to the section view of FIG. 4 with continuing reference to FIGS. 1-3, the lighting assembly 18 is positioned on an interior side 34 of a window 38 of the vehicle 10. A bracket 42 holds the lighting assembly 18 relative to a surround structure 46 of the window 38. The surround structure 46 can be a reinforced steel member, for example. The surround structure 46 provides, in some examples, a heat sink for the lighting assembly 18. Heat sinking to the surround structure 46 can, in some examples, prolong the useful life of the light emitting devices 22 by effectively distributing thermal energy. The surround structure 46 can be part of a roof of the vehicle 10 or an added structure that is separate from the roof.

An adhesive seal 48 secures the window 38 to the surround structure 46. The adhesive seal 48 blocks contaminates and moisture from moving to the interior side 34 between the window 38 and the surround structure 46.

The base 30 is, in this example, an aluminum core, heat-conductive printed circuit board. A bonding agent 50 can be used to adhere the base 30 to the bracket 42. The bonding agent 50 can be a conformal heat conductive bonding agent.

A housing 54 surrounds at least some of the lighting assembly 18. The housing 54 includes a gap 58 to permit light L from the light emitting devices 22 to move toward the window 38. Light L from the light emitting device 22 moves through the window 38 to illuminate areas on an exterior side 62 of the window 38, which are outside the vehicle 10. The housing 54 protects and controls light spill from the light emitting device 22 to the interior side 34.

Light from the light emitting device 22 can be controlled, in part, by drive and control circuitry 66, which is also mounted to the base 30. A lighting controller 70 is operably connected to the control circuitry 66. The lighting controller 70 can activate the light emitting devices 22 of the first group 26a, the second group 26b, the third group 26c, or combinations thereof. The intensity of light from the light emitting devices 22 can be controlled by the lighting controller 70. In some examples, lensing are used to widen or narrow the beams of light L from one or more of the light emitting devices 22. The lensing can be positioned within the bracket 42 between the light emitting device 22 and the window 38.

Figure 5:
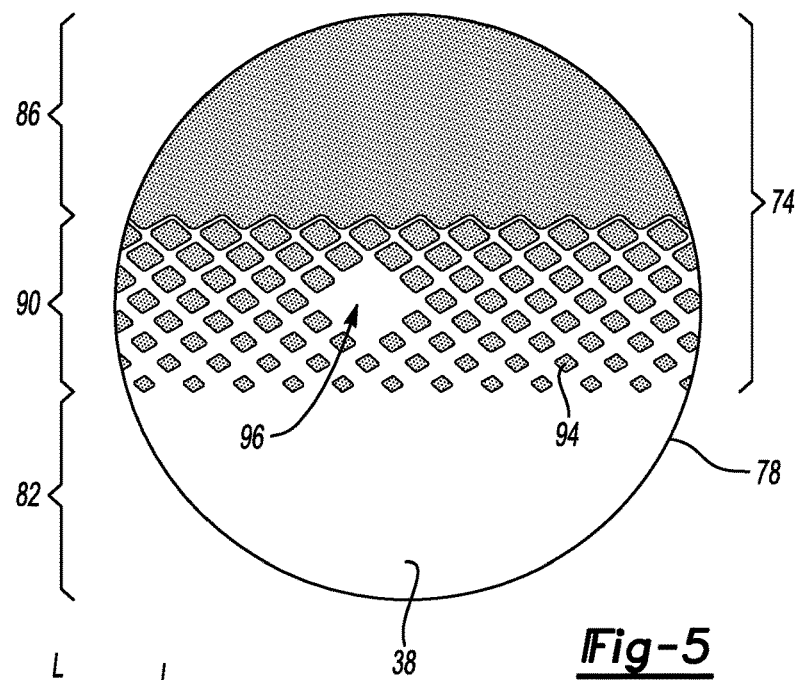
FIG. 5 illustrates a close-up view of Area 5 in the windshield of FIG. 3.

Referring now to FIG. 5 with continuing reference to FIGS. 3 and 4, the window 38 includes a perimeter region 74 that extends circumferentially about an outer periphery of the window 38. The perimeter region 74 is at least partially covered with a coating 78. In some examples, the coating 78 is a screen printing on the perimeter region 74 of the window 38. The coating 78 is referred to as a frit in some examples. The coating 78 can comprise a ceramic material. In some examples, the coating 78 is screen-printed on the window 38.

The coating 78 is opaque in this exemplary embodiment, and extends circumferentially about the window 38 to define an outer perimeter of a daylight opening 82 through the window 38. The coating 78, in this exemplary non-limiting embodiment, includes a solid portion 86 that transitions to a dotted portion 90 defining the outer periphery of the daylight opening 82. The dotted portion 90 includes, in this example, a plurality of dots 94. A diameter of the dots 94 gradually decreases moving inward from the solid portion 86 to the daylight opening 82.

The lighting assembly 18 is positioned adjacent the perimeter region 74, and the light L from the light emitting devices 22 moves through the perimeter region 74 to illuminate the exterior side 62.

The coating 78 includes a plurality of apertures 96 to permit the light L to pass through the perimeter region 74 without being blocked by the coating 78. The apertures 96 each generally align with one of the light emitting devices 22. Since the lighting assembly 18 includes, in this example, twelve individual light emitting devices 22, the coating 78 includes twelve corresponding apertures 96 to permit illumination of the exterior side 62 from the light emitting devices 22.

The apertures 96 have a perimeter residing entirely, in this example, within the coating 78 and thus outside the daylight opening 82. In particular, the example apertures 96 reside entirely within the dotted portion 90. In other examples, the apertures 96 could be positioned within the solid portion 86, or some combination of the solid portion 86 and the dotted portion 90.

When viewing the window 38 from the exterior side 62, the lighting assembly 18 is substantially hidden by the coating 78. Thus, the lighting assembly 18 does not disrupt the overall aesthetic integrity of the vehicle.

Figure 6:
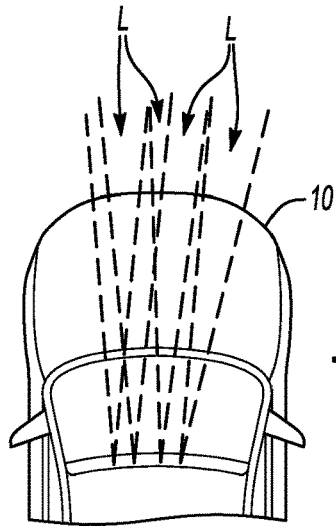
FIG. 6 illustrates a top view of a portion of the vehicle of FIG. 1 when the lighting assembly is illuminating an area.
Figure 7:
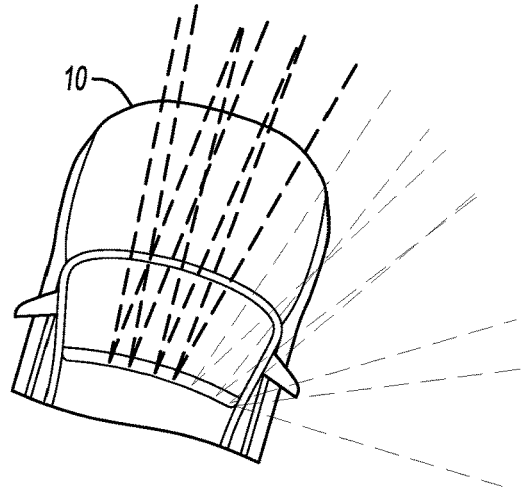
FIG. 7 illustrates the top view of FIG. 5 when an orientation of the vehicle has changed and the lighting assembly is illuminating another area.
Figure 8:
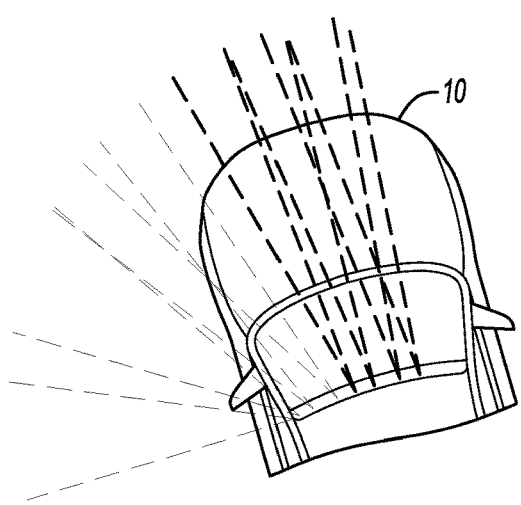
FIG. 8 illustrates the vehicle of FIG. 5 when the orientation of the vehicle has changed and the lighting assembly is illuminating still another area.

Referring now to FIGS. 6 to 8 with continuing reference to FIGS. 1 to 3, the groups 26a, 26b, and 26c of light emitting devices 22 can be selectively activated in response to a change in an orientation of the vehicle 10. In an exemplary non-limiting embodiment, the group 26a is activated when the vehicle is driven forward as shown in FIG. 6. Activating the group 26a, but not the groups 26b and 26c, provides four beams of light L from the lighting assembly 18. One beam emits from each light emitting device 22 within the group 26a.

In response to a detected change in an orientation of the vehicle 10, such as a turn toward a passenger side of the vehicle 10, the second group 26b of light emitting devices 22 can be activated in addition to the first group 26a of light emitting devices 22. This, as shown in FIG. 7, illuminates areas on the passenger side of the vehicle 10 that will be traversed due to the vehicle 10 turning toward the passenger side. Activating the groups 26a and 26b, but not the groups 26c, provides eight beams of light L from the lighting assembly 18.

The light emitting devices 22 in the group 26b can be angled outward from the centerline of vehicle 10 to direct the beams of light from the group 26b outward toward the passenger sides. The curvature of the window 38 from the vehicle centerline toward the passenger side can also facilitate directing the beams of light L from the group 26b toward the passenger side.

The lighting controller 70 can automatically activate the second group 26b in response to the detected change. The lighting controller 70 can receive information enabling the lighting controller 70 to assess whether or not the second group 26b should be activated. The lighting controller 70 could, for example, receive an input indicating that the driver has rotated a steering wheel in a clockwise direction. The lighting controller 70 interprets this as a detected change in the orientation of the vehicle 10. The lighting controller 70 could also receive information from sensors on the vehicle 10 indicating that the vehicle 10 is turning toward the passenger side. Global Positioning System information could also be used by the lighting controller 70 to indicate that the vehicle 10 is turning.

In response to a detected change in an orientation of the vehicle 10, such as a turn toward a driver side of the vehicle 10, the third group 26c of light emitting devices 22 can be activated in addition to the first group 26a to illuminate areas on the driver side of the vehicle 10. This, as shown in FIG. 8, illuminates areas on the driver side of the vehicle 10 that will be traversed due to the vehicle 10 turning toward the driver side. The lighting controller 70 can automatically activate the third group 26c in response to the detected change.

The light emitting devices 22 in the group 26c can be angled outward from the centerline of the vehicle 10 to direct the beams of light from the group 26c outward toward the driver side. The curvature of the window 38 from the vehicle centerline toward the driver side can also facilitate directing the beams of light L from the group 26c toward the passenger side.

The light emitting devices 22 can turn off and on in response to a command from the lighting controller 70. The input to the lighting controller 70 can be an automatic input, or a manual input through, for example, a touch screen programmable control. In some examples, a manual input can override an automatic input.

In a non-limiting exemplary embodiment, the lighting controller 70 keeps at least some of the light emitting devices 22 off in response to an input of Global Positioning System information indicating that the vehicle 10 is on a road and thus not off-roading. The input can prevent the light emitting devices 22 from activating when the vehicle 10 is not off-roading. In such an example, the light emitting devices 22 may only turn on if a warning is sent to an operator of the vehicle and an input is received from the operator overriding the automatic deactivation. If the light emitting devices 22 are activated and the vehicle 10 is not off-roading, a warning could be sent to the operator, such as a visual or audible warning. The light emitting devices 22 then deactivate after a threshold time period has passed.

In a non-limiting exemplary embodiment, the lighting controller 70 activates at least some of the light emitting devices 22 when in a parking structures to enhance visibility and security. The lighting controller 70 could, for example, activate at least some of the light emitting devices 22 in response to information from an ultrasonic parking sensor system indicating an open parking space that is less than a threshold width, say 30 feet, and in response to information from a speed sensor system indicating that the speed of the vehicle 10 is below a threshold speed, say 5 miles per hour. In response to these inputs, the lighting controller 70 can activate at least some of the light emitting devices 22 at a medium intensity to clearly illuminate the area, which may be a potential parking spot.

If the lighting controller 70 then receives an input from the ultrasonic sensor system indicating that the clearance between the vehicle 10 and surrounding structures is less than, say 1.5 feet on two or more sides of the vehicle 10 and the front or the back of the vehicle 10, and the lighting controller 70 further receives an input from the speed sensor system that the vehicle 10 is has not moved for more than, say 5 seconds, the lighting controller 70 will automatic deactivate the light emitting devices 22. The lighting controller 70 interprets these inputs as indicating that the vehicle 10 has parked and lighting from the light emitting devices 22 is no longer needed.

In an exemplary non-limiting embodiment, the lighting controller 70 automatically increases an intensity of light from at least some of the light emitting devices 22 when a speed of the vehicle 10 increases. Correspondingly, the lighting controller 70 can automatically decrease an intensity of light from at least some of the lighting controller 70 when a speed of the vehicle 10 decreases. The lighting controller 70 can adjust intensity by changing current to the light emitting devices 22.

The lighting controller 70 can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The lighting controller 70 may be a hardware device for executing software, particularly software stored in memory that may include one or more separate programs, each of which includes an ordered listing of executable instructions for implementing logical functions. The lighting controller 70 can comprise a custom made or commercially available processor, a central processing unit (CPU), an auxiliary processor among several processors associated with the computing device, a semiconductor based microprocessor (in the form of a microchip or chip set) or generally any device for executing software instructions. The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.).

In a non-limiting exemplary embodiment, an operator of the vehicle 10 can communicate with the lighting controller 70 to activate or deactivate the light emitting devices 22 within one or more of the groups 26*a*, 26*b*, and 26*c*. The operator can communicate with the lighting controller 70 by interfacing with a user interface.

The user interface can be, for example, a touch screen within the vehicle 10 via which information can be communicated to the driver/operator or through which the driver can communicate to the lighting controller 70, or the user interface may be a wireless communication interface comprising a mobile device such as a smart phone or tablet, or an internet browser for example. In addition, the user interface can also include a wireless communication interface where the user can communicate with the lighting controller 70 via a mobile device such as a smart phone or tablet, or an internet browser for example.

The user may interact with the user interface to, for example, cause the lighting controller to activate the light emitting devices 22 in all of the groups 26*a*, 26*b*, and 26*c* even though the vehicle 10 is stationary or traveling along a straight path. The user may activate the light emitting devices 22 in all of the groups 26*a*, 26*b*, and 26*c* to maximize the area illuminated by the light emitting devices 22. In such example, the light emitting devices 22 can provide a spotlight functionality, which could be particularly useful for law enforcement vehicles. The spotlight functionality could use one or more of the light emitting devices 22 when at a high intensity. The spotlight can be "steered" by turning on different ones of the light emitting devices 22. Some of the light emitting devices 22 could be pointed upwards, for example, and those light emitting devices 22 are turned on to direct the spotlight upwards. The steering and intensity of the spotlight can be controlled by an operator through a touch screen, for example.

The user can additionally interact with, for example, a slider on a touch screen interface within the vehicle 10, to turn off and on individual light emitting devices 22. The user can effectively steer or sweep light from the lighting assembly 18 by turning off and on individual light emitting devices 22 as desired.

As previously mentioned, the lighting assembly 18 can optionally include lensing associated within one or more of the light emitting devices. The lensing can be actuated in response to a command from the lighting controller 70 to, for example, widen or narrow the bean from one of the light emitting devices 22.

Figure 9:
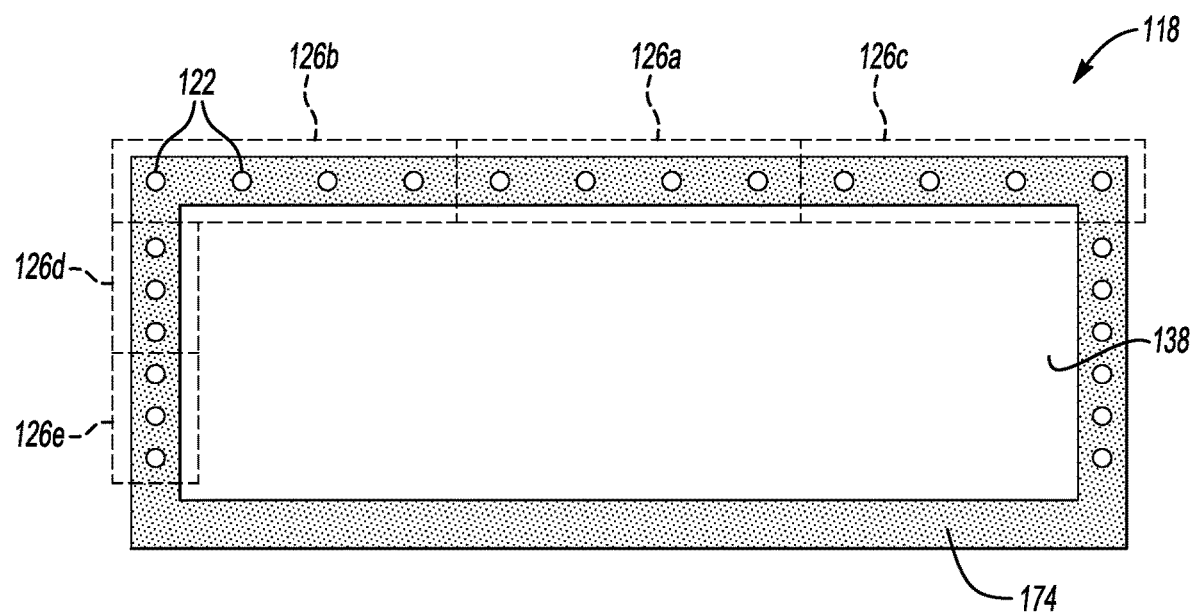
FIG. 9 illustrates a front view of a lighting assembly and window according to another exemplary embodiment.

Referring now to FIG. 9, in another exemplary embodiment, a lighting assembly 118 is positioned to illuminate areas through a perimeter region 174 of a window 138. The lighting assembly 118 includes groups 126*a*, 126*b*, and 126*c* of light emitting devices 122 along a vertical top of the window 138. The lighting assembly 118 additionally includes groups 126*d* and 126*e* of light emitting devices 122. The groups 126*d*, 126*e* are vertically offset from one another, and from the groups 126*a*, 126*b*, and 126*c*.

In response to a vehicle having the lighting assembly 118 ascending a grade, the groups 126*a*-126*e* can be selectively activated to illuminate areas vertically higher than the areas illuminated by the lighting assembly 118 when the vehicle is traversing along level ground.

When the vehicle having a lighting assembly 118 is descending a grade, the groups 126*a*-126*e* can be selectively activated to selectively illuminate areas vertically lower than the areas illuminated by the lighting assembly 118 when the vehicle is traversing along level ground.

Although vertical offset is used to aim the light from the light emitting devices 122 higher or lower, other examples could aim the light higher by turning on light emitting devices 122 that point upwards, or aim the light downward by turning on light emitting devices 122 that point upwards. In such an example, the light emitting devices 122 could be at the same vertical position, but have their orientations adjusted relative to each other to project the light upward or downward.

Figure 10:
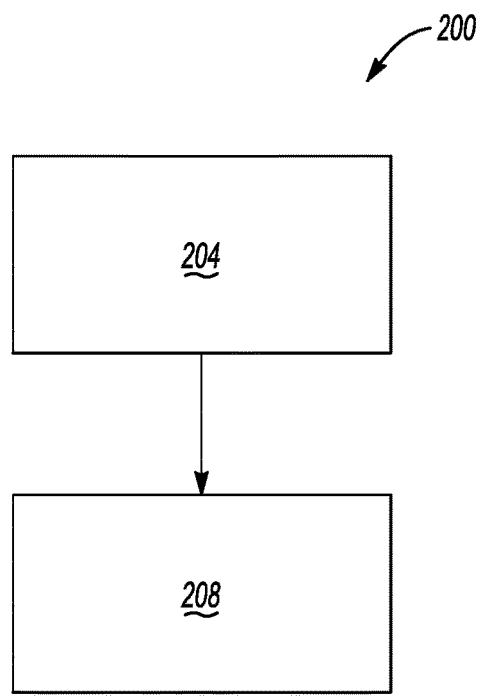
FIG. 10 illustrates a flow of an example illuminating method.

Referring now to FIG. 10, an exemplary method 200 method of illuminating areas outside a vehicle includes a step 204 of passing light from a light emitting device on an interior side of a window through an aperture in a coating on the window. At a step 208 the method 200 responds to a detected change in an orientation of the vehicle by passing light from a second light emitting device on the interior side through the window. The detected change can be an input from a driver, such as an adjustment to a steering wheel, or an actual change in the path the vehicle is traveling, such as detecting that the vehicle is cornering.

Features of this disclosure include light emitting devices that can illuminate areas outside a vehicle. The light emitting devices are covered by a window to unobtrusively fit within the design outline of the vehicle thereby avoiding the "add-on" look of known auxiliary lighting systems. The light emitting device can be adjacent a peripheral region of the window that is covered by a coating. The coating shields the light emitting devices from view from outside the vehicle.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A lighting assembly, comprising:
a first light emitting device on an interior side of a window of a vehicle; and
a second light emitting device on the interior side, the first and the second light emitting devices configured to selectively illuminate respective areas through a perimeter region of the window in response to a change in an orientation of the vehicle.

2. The lighting assembly of claim 1, wherein the respective areas are on an exterior side of the window.

3. The lighting assembly of claim 1, further comprising a coating in the perimeter region of the window, wherein the first and second light emitting devices illuminate the respective areas through apertures in the coating.

4. The lighting assembly of claim 3, wherein the coating is opaque.

5. The lighting assembly of claim 3, wherein the coating defines a daylight opening through the window, and the aperture in the coating is outside an outer perimeter of the daylight opening.

6. The lighting assembly of claim 1, wherein the first light emitting device is positioned further from a lateral side of the vehicle than the second light emitting device, and the second light emitting device is configured to illuminate the respective area in response to the vehicle turning toward the lateral side.

7. The lighting assembly of claim 1, wherein the first and second light emitting devices are configured to illuminate the respective areas in response to the vehicle ascending or descending a grade.

8. The lighting assembly of claim 1, further comprising a third light emitting device, the first light emitting device disposed horizontally between the second light emitting device on a passenger side of the vehicle, and the third light emitting device on a driver side of the vehicle,
the first light emitting device configured to illuminate the area when the vehicle turns toward the passenger side or the driver side,
the second light emitting device configured to illuminate the area when the vehicle turns toward the passenger side, but not when the vehicle turns toward the driver side,
the third light emitting device configured to illuminate the area when the vehicle turns toward the driver side, but not when the vehicle turns toward the passenger side.

9. The lighting assembly of claim 1, wherein the first and second light emitting devices each comprise at least one light emitting diode.

10. A lighting assembly, comprising:
a window of a vehicle, the window having a perimeter region;
a coating covering at least a portion of the perimeter region; and
a light emitting device on an interior side of the window, the coating providing at least one aperture to permit light from the light emitting device to move through the perimeter region.

11. The lighting assembly of claim 10, wherein the coating defines a daylight opening through the window, and the aperture in the coating is outside an outer perimeter of the daylight opening.

12. The lighting assembly of claim 10, wherein the coating is opaque.

13. A method of illuminating an area outside a vehicle, comprising:
passing light from a light emitting device on an interior side of a window through an aperture in a coating covering at least a portion of the window, the light illuminating an area on an exterior side of the window.

14. The method of claim 13, wherein the light emitting device is a first light emitting device, and further comprising selectively passing light from a second light emitting device on the interior side through the window in response to a detected change in an orientation of the vehicle.

15. The method of claim 14, wherein the second light emitting device is closer to lateral side of the vehicle than the first light emitting device, and the second light emitting device is activated to pass light through the window in response to the vehicle turning toward the lateral side.

16. The method of claim 14, wherein the second light emitting device is activated to pass light through the window in response to the vehicle ascending or descending a grade.

17. The method of claim 13, wherein the first light emitting device comprises at least one light emitting diode.

18. The method of claim 13, wherein the aperture is an aperture in a frit.

19. The method of claim 13, wherein the coating defines a daylight opening through the window, and the aperture in the coating is outside an outer perimeter of the daylight opening.

20. The method of claim 13, wherein the coating is opaque.

* * * * *